United States Patent [19]

Fink et al.

[11] Patent Number: 5,760,887
[45] Date of Patent: Jun. 2, 1998

[54] MULTI-PULSE, MULTI-RETURN, MODAL RANGE PROCESSING FOR CLUTTER REJECTION

[75] Inventors: David Fink, Los Angeles; Maurice Halmos, Van Nuys; Dave Goran, Los Angeles, all of Calif.

[73] Assignee: Hughes Electronics, Los Angeles, Calif.

[21] Appl. No.: 641,255

[22] Filed: Apr. 30, 1996

[51] Int. Cl.$^6$ .................................................. G01C 3/08
[52] U.S. Cl. .............................................. 356/5.03
[58] Field of Search ........................... 356/5.01, 5.03; 392/95, 159

[56] References Cited

U.S. PATENT DOCUMENTS

4,259,592  3/1981  Früngel et al. ................ 350/574
4,518,256  5/1985  Schwartz ........................... 356/5

*Primary Examiner*—Mark Hellner
*Attorney, Agent, or Firm*—Leonard A. Alkov; William C. Schubert; Glenn H. Lenzen, Jr.

[57] ABSTRACT

A laser rangefinding system (12) that utilizes multiple pulse, multiple return, modal range processing for clutter rejection. A laser source (16) emits a series of laser beam pulses (42), and each reflected return from objects (46) in a scene for each of the pulses is recorded. Each return signal above a predetermined threshold is added as a count to a count table within a selected bin representing the range of the return signal. After all of the analog return signals are recorded, the range bin with the most counts is selected as the range of a target.

16 Claims, 6 Drawing Sheets

MULTI-PULSE, MULTI-RETURN, MODAL RANGE PROCESSING FOR CLUTTER REJECTION

BACKGROUND OF THE INVENTION

1. Field of the Invention

This invention relates generally to a method and apparatus for clutter rejection in a laser range finding system and, more particularly, to a laser range finding system that uses multiple return pulses and modal range processing to separate targets from clutter objects in a scene.

2. Discussion of the Related Art

In order to provide increased targeting efficiency, different types of weapons systems may incorporate some type of automatic fire control system that includes a range finding system that determines the range from the weapon to a target of interest for appropriate targeting. These types of weapons systems may be attached to various weapons platforms, such as tanks, aircraft, ships, etc. By providing the distance from the weapon to the target, the automatic fire control system can compensate for different variables, such as elevation and wind during the targeting. Different types of rangefinding systems that perform this function are known in the art. It has heretofore been a consideration to adapt rangefinders to hand-held rifles and the like.

Known rangefinders are typically laser rangefinders that emit a suitable laser beam from a laser source positioned on the weapon. The emitted laser beam is reflected off of the target and received by a suitable detector also positioned on the weapon. The time it takes the laser beam to be emitted from the laser source and the reflected return beam to be received by the detector determines the range of the target. The measurements of the range to the target are often degraded by return signals from clutter objects in the scene. In other words, the emitted laser beam may be inadvertently reflected off of other objects in the scene besides the target. These return signals may also be received by the detector. Therefore, the detector generally receives many return signals from a single transmission burst.

Clutter return signals occur mainly because of beam divergence of the emitted laser beam and pointing jitters causing movement of the beam. Beam divergence causes some of the laser light to spread beyond the angular subtense of the target, thus illuminating objects that may be closer or farther than the target of interest. Pointing jitters similarly cause the laser beam to sometimes be misdirected towards the target, and to illuminate targets closer or farther than the target of interest. For hand-held rifles, pointing jitters are especially critical.

Known laser rangefinders usually report the range of the target of interest from the first reflected return signal. Such a mode of operation is generally effective if there are no clutter objects at a range closer than the target that may reflect the emitted laser beam. This type of system is also the simplest method to implement in hardware. A variation to this simple approach that requires slightly more complex hardware is to report the range to the last return signal. However, neither of these methods gives highly accurate results in the presence of clutter objects, aiming jitter, or wide beam widths.

Another known method of laser range finding is referred to as pulse averaging. In pulse averaging, the analog return signals from successive beam shots are accumulated until the sum crosses a threshold at a certain range. This known approach is susceptible to being drawn to clutter having a larger reflectivity than the target of interest. A highly reflective clutter object that occasionally returns a large signal can outweigh a less reflective target that often returns a smaller signal.

What is needed is a laser range finding system that provides enhanced clutter rejection over the known laser range finding systems, and is applicable to be used on a hand-held rifle. It is, therefore, an object of the present invention to provide such a system.

SUMMARY OF THE INVENTION

In accordance with the teachings of the present invention, a laser range finding system is disclosed that utilizes multiple laser pulses transmitted towards a target of interest from a laser source. For each transmitted pulse, every reflected return signal received by a detector of the system is recorded. At the end of the series of transmitted pulses, the range associated with the return signals that occurred the most frequently for the combination of all of the return signals is the best estimate of the range of the target.

In one embodiment, the invention is implemented by preparing a count table that establishes a number of bins where each bin represents a range of distances such that the entire series of bins gives every range practical for the targeting purposes. After the laser source is fired, the detector generates analog return signals of the range of the reflected signals received. The analog return signals are then compared with a threshold, and a count is added to each bin in the count table whose range coincides with the range of the analog return signals above the threshold. This process is continually performed over the several pulses, and the counts in the range bins of the table are accumulated.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a laser range finding system and method of rejecting clutter is merely exemplary in nature, and is in no way intended to limit the invention or its applications or uses.

Figure 1:
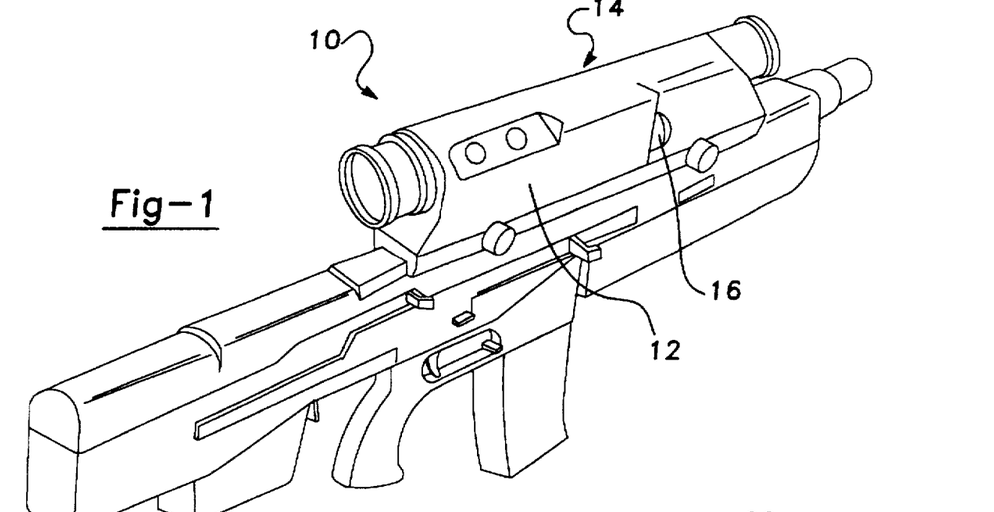
FIG. 1 is a plan view of a hand-held rifle including a multi-pulse, multi-return laser rangefinder according to an embodiment of the present invention.

FIG. 1 shows a plan view of a hand-held rifle 10 including a laser rangefinding (LRF) system 12 that is used to determine the distance of a potential target from the rifle 10. The LRF system 12 is incorporated as part of an optical sighting system 14 used by an operator (not shown) of the rifle 10 to visualize the target within a scene. When the operator activates the LRF system 12, a laser beam source 16 emits a series of laser beam pulses in a direction towards the target. As will be appreciated by those skilled in the art, various optical components are included in the sighting system 14 that allow the operator to view the scene through the sighting system 14, and also allow the laser beam to be transmitted through the sighting system 14. The particular optics and components of the sighting system 14 do not form any part of the invention herein, and can be any configuration suitable for the purposes of the invention. Likewise, although the LRF system 12 of the invention, as described below, is shown in association with the hand-held rifle 10, the LRF system 12 may have application to any laser rangefinding system for a weapon or otherwise.

The invention is directed to a modal range processing technique for determining the range of the target from the rifle 10 that reduces or eliminates errors that may occur as a result of objects in the scene that may be reported as the target. As will be described in greater detail below, this technique includes firing a predetermined number, such as sixteen, of successive rangefinder pulses from the laser source 16, and for each pulse, recording every range signal return. At the end of the series of pulses, the range that occurred most frequently determined through modal processing described below is the best estimate of the range to the target.

In one embodiment, the laser source 16 is a solid state optically pumped laser providing a wavelength of 1.57 microns, having an output power of approximately 2 millijoules, giving an effective range of approximately 1000 meters, and having a pulse width of about 6.7 nanoseconds. It is stressed, however, that these values are given by way of a non-limiting example, in that other appropriate values can also be used within the scope of the present invention for this or other LRF systems.

In one embodiment, the invention is implemented by preparing a count table that establishes a number of bins where each bin represents a range of distances and the entire series of bins gives every range practical for the targeting purposes. When the laser source is fired, the detector generates analog return signals of the range of the reflected signals received. The analog return signals are then compared with a threshold, and a count is added to each bin in the count table whose range coincides with the range of the analog return signals above the threshold. This process is continually performed over the several pulses, and the counts in the range bins of the table are accumulated.

After all of the pulses are transmitted, the bin with the maximum number of counts is selected, and its corresponding range is the best estimate of the range to the target. If two or more bins have the maximum number of counts, the bin corresponding to the closest range is chosen. For improved range accuracy, the analog return signals, or a quantitative representation of the return signals, are accumulated over the series of transmitted pulses. After the range bin with the maximum number of counts is determined, the centroid of the accumulated analog signal peak in or nearest to the selected bin is found, and the range corresponding to its centroid becomes the best range estimate.

For line-of-sight (LOS) jitters, the target being aimed at is at the center of the jitter pattern, and is therefore the object most likely to be hit by the laser beam, most likely to be hit by the most intense part of the beam, and most likely to be hit with enough intensity to give a return signal regardless of the direction of the jitters. Return signals from clutter objects offset from the target in some direction will drop out as the beam jitters to the other side of the target.

Figure 2:
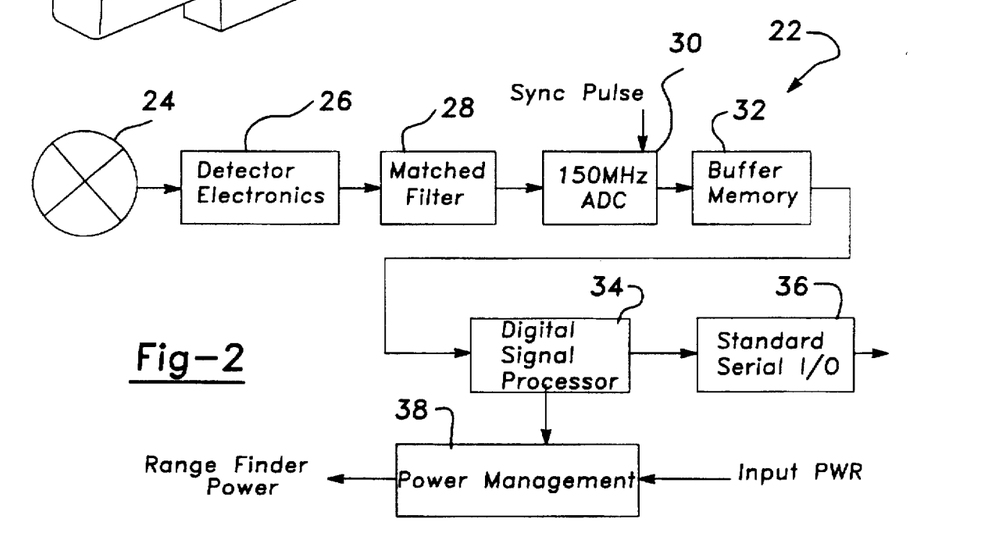
FIG. 2 is a schematic block diagram of a receiver channel in the laser rangefinder of the invention.

FIG. 2 shows a schematic block diagram of a detector channel 22 generally depicting one set of components operable to perform the operation of the invention. Return signals from the scene are received by a detector 24. In one embodiment, the detector 24 is a InGaAs avalanche photodiode applicable to detect the desired wavelengths of the emitted laser beam. However, other detectors may be equally suitable for the purposes of the invention as described herein. The detector 24 receives the return signals and converts the laser beam signals into indicative electrical analog signals. These analog signals are applied to detector electronics 26 in order to amplify the signals to a level useable by the LRF system 12. The amplified detector signal is then applied to a matching filter 28 that passes frequencies including the return signals, and eliminates other signals outside of this range of frequencies for noise suppression purposes so as to increase the signal-to-noise ratio. The filtered detector signal is then applied to an analog-to-digital converter (ADC) 30 in order to convert the analog return signals to comparable digital signals suitable for the high level data processing of the invention. The ADC 30 operates at 150 MHz to correspond to the width of the pulses to give the resolution for the bins. The digital signals of the analog return signals are then stored in a buffer memory 32 to be applied to a digital signal processor 34 that performs the modal processing according to the invention, as described herein. Outputs from the digital signal processor 34 are applied to a standard serial input/output 36 to be sent to other portions of the rangefinding system. A synchronization pulse is applied to the digital signal processor 34 to provide synchronization with the pulses emitted from the laser source 16. A power management system 38 receives input power from, for example a battery, and provides suitable power output to the various components of the LRF system 12.

Figure 3A:
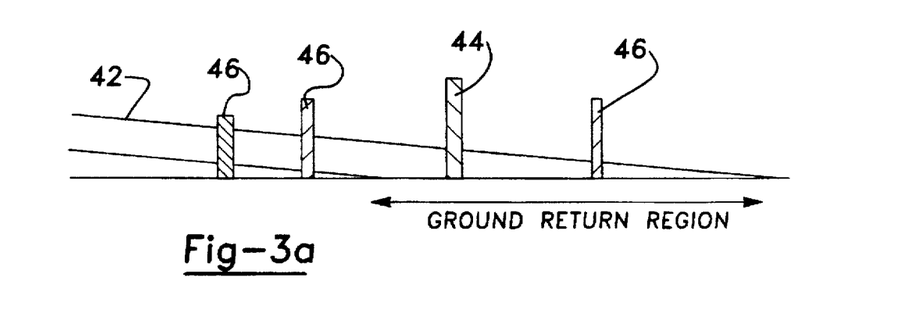
FIGS. 3(a)–3(c) depict a simulation and resulting return signals of a single laser rangefinder shot according to the invention.

FIG. 3(a) shows a simulation of a single laser pulse from, for example, the source 16 of the LRF system 12. An LRF beam 42 impinges a target 44, a series of clutter objects 46 and the ground along a ground return region along the beam LOS. The clutter objects 46 are not necessarily directly in front of the target 44, although some may be. Of course, if the target 44 is completely, or nearly completely, obscured by the objects 46, then it will not be detected. Return signals reflected from the objects 46, the target 44 and the ground are received by the detector 24.

Figure 3B:
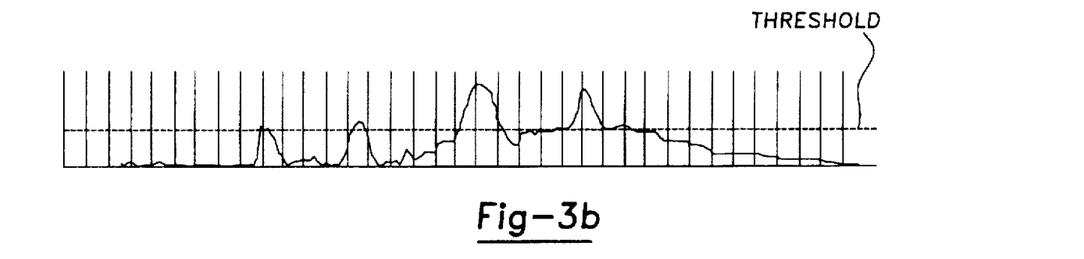

FIG. 3(b) shows a graph of an analog return signal of the beam 42 in which the horizontal direction represents time and the vertical direction represents detected power relative to a threshold level. The threshold level is usually set to keep noise-induced false alarms below a desired value when there are no targets present. Additionally, the threshold level can be used to discriminate against weak return signals. Each vertical line along the horizontal time line separates the analog return signals into range bins. The width of the bins is the range resolution of the LRF system 12, and is on the order of one meter. In other words, this width represents the width of the 6.7 nanosecond transmitted pulses.

Figure 3C:
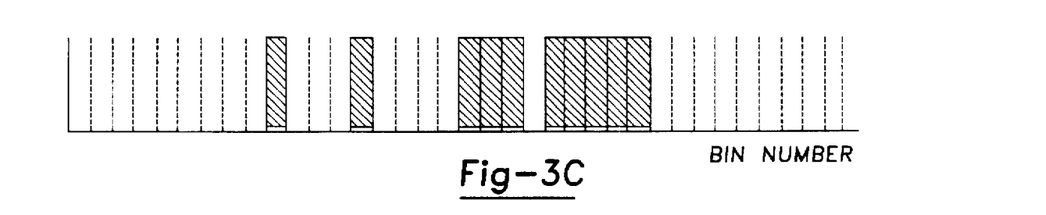

FIG. 3(c) shows a table of each of the bins represented in FIG. 3(b) where each bin is assigned a bin number. If a return signal is received above the threshold level for the particular bin, then a count is added to the particular bin, as indicated by the shaded region. For subsequent shots, a count will be added to each bin that includes a signal above the threshold, such that some representation is provided for the increased count in each bin.

Figure 4A:
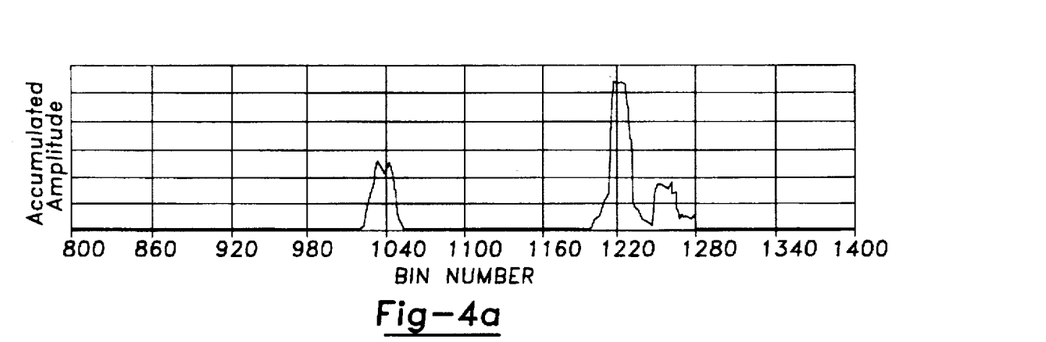
FIGS. 4(a) and 4(b) depict graphs showing multi-pulse, multi-return, modal processing for the laser rangefinder of the invention.

As discussed above, a count is added to each bin each time the analog signal crosses the threshold for that bin over successive shots. Once all of the return signals are acquired, the range bin with the maximum number of return signal counts is selected as the bin of the target. The range for this bin is the range to the target 44 from the LRF system 12. If improved accuracy is desired, the analog signals of all the shots are accumulated. Then, the range to the target 44 is determined by going back to the accumulated amplitude plot and determine the centroid of the peak of the range bin selected. This depiction is shown by graph in FIG. 4(a). The vertical axis of the graph represents accumulated amplitude, and the horizontal axis represents the bin numbers.

Figure 4B:
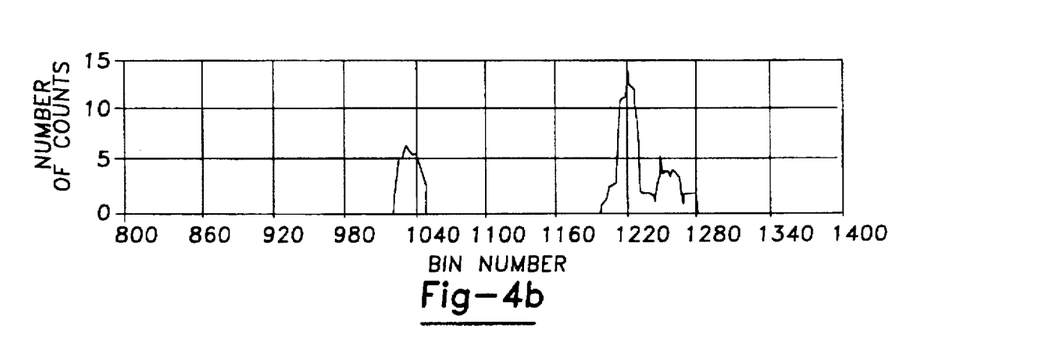

FIG. 4(b) shows a plot for the number of counts in each bin, where the number of counts is given on the vertical axis and the bin number is given on the horizontal axis. From this analysis, it is determined that range bin number 1220 has the maximum number of shots, and therefore is the target. Therefore, the declared range of the target 44 is determined by using the plot in FIG. 4(a), and finding the centroid of the peak near the range bin number 1220. Various mathematical techniques can be used to find the centroid of the peak within the selected range bin. For example, a signal weighted centroid technique can be used by first multiplying each range within the selected bin by the analog signal for that range, and then adding together each of those values. To determine the centroid, this added value is then divided by the sum of all of the signals in the bin. A second technique includes the use of a constant fraction discriminator, known to those skilled in the art.

Use of a threshold applied to the return analog signals to decide which of the range bins will receive counts is one type of a signal filter that can be used in accordance with the invention. Other filters can be used in place of, or in conjunction with, this threshold filtering technique, such as high-pass filters or pulse-width discriminators. Several filters can also be used simultaneously or in series. Whatever range bins are selected by the filtering process are the ones accumulated for the series of processes for modal range processing.

Modal range processing can be combined with other signal processing techniques to improve the signal-to-noise ratio ahead of the threshold process. For example, post-detection-integration (PDI), known to those skilled in the art, can also be used. In PDI, the analog signal is accumulated over several shots, and then this accumulation is applied to the threshold filter. For multi-pulse, multi-return, modal range processing, whatever occurs before the threshold is considered one event, and the output from the threshold filter is used to add counts to the range bins in the table of counts. Thus, several shots are used in the PDI mode, the filter output is accumulated in the counts table, and another set of PDI shots is taken to then get another threshold output, which is accumulated in the counts table. This continues until the desired number of events is accumulated into the counts table, and then the bin with the most number of counts is selected.

Two additional variations of the modal range processing of the invention described above can also be used that incorporate the most common first return signal and the most common last return signal. Particularly, the range of the target is determined by selecting the bin having the most counts for the first return signal for each of the successive pulses in a "most common first return signal" filter, and the range of the target is determined by selecting the bin having the most counts for the last return signal for each of the successive pulses in a "most common last return signal" filter.

Figure 5:
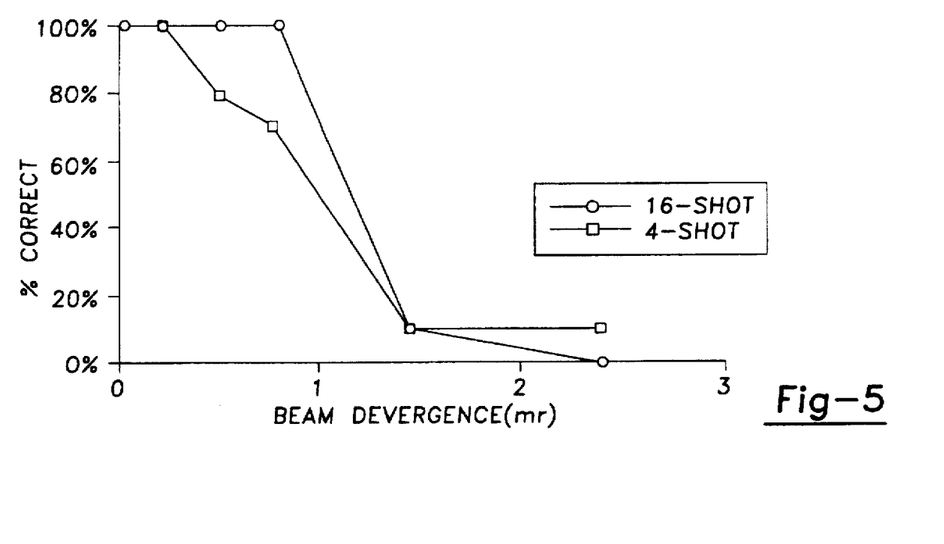
FIG. 5 is a graph depicting percentage of cases giving the correct range using a most common first return scheme.
Figure 6:
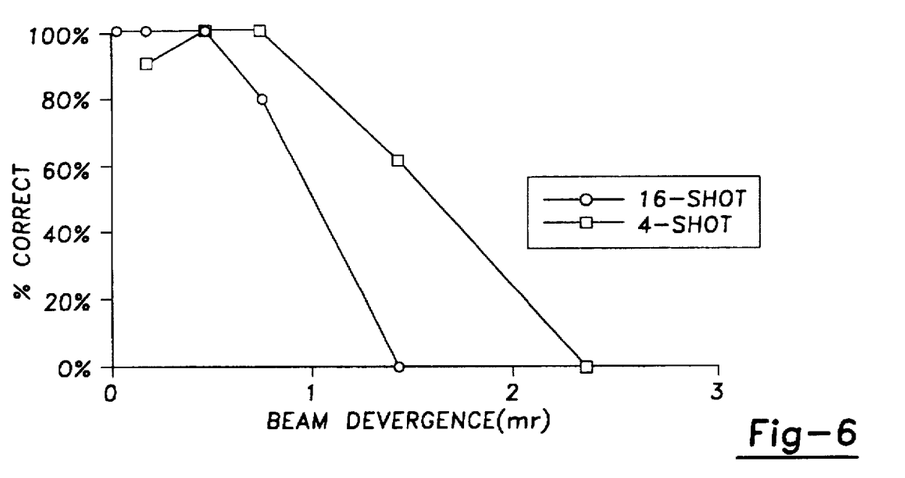
FIG. 6 is a graph giving a percentage of cases having the correct range using a most common last return scheme.

FIG. 5 is a graph showing the percentage of correct range results of the target using the "most common first return signal" filter for a sixteen shot application and a four shot simulation application. Beam divergence in milli-radians is given on the horizontal axis and the percent the correct target was selected is given on the vertical axis. Likewise, FIG. 6 is a graph showing the percentage of the correct range results of the target using the "most common last return signal" filter for both the sixteen-shot and four-shot simulation.

Two other variations of the invention can also be considered to determine the target. These variations include determining the range that was most often the first return signal, and the range that was most often the last return signal. The distinction between these and the previously discussed variations is that the "first return most often" filter picks out the histogram of the range that was the first return more often than any other range was a first return, while the "most often first return" filter selects the fraction of times that the range was a first return out of all the times that the range gave any return. The range with the largest fraction is selected. The same analysis holds true for a "last return most often" filter.

Figure 7:
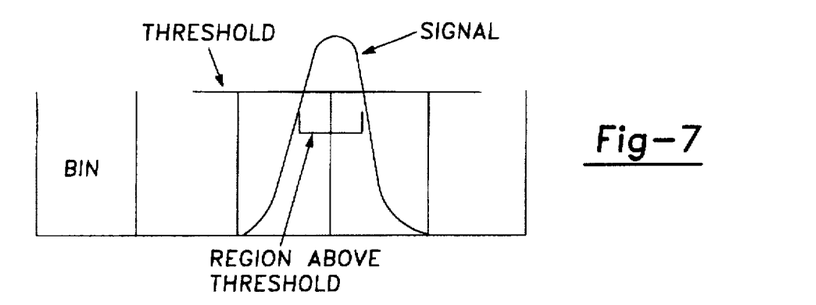
FIG. 7 is a depiction of a "signal above the threshold" filter used in the laser rangefinder of the invention.

With some types of filters, there may be problems if the target is located at the boundary between two range bins, where on some shots a count is added to the front bin, and on other shots a count is added to the rear bin. This would reduce the number of counts in either bin by a factor of two, so the chance that either bin would have more counts than a clutter bin is significantly reduced. For a "signal above threshold" filter discussed above, this generally will not occur. For example, consider some bins for a "signal above threshold" filter shown in FIG. 7. This filter flags any bin in which the signal is above the threshold, and if a target is at the boundary, the signal will be above the threshold in both bins. Therefore, both bins will be flagged.

Figure 8:
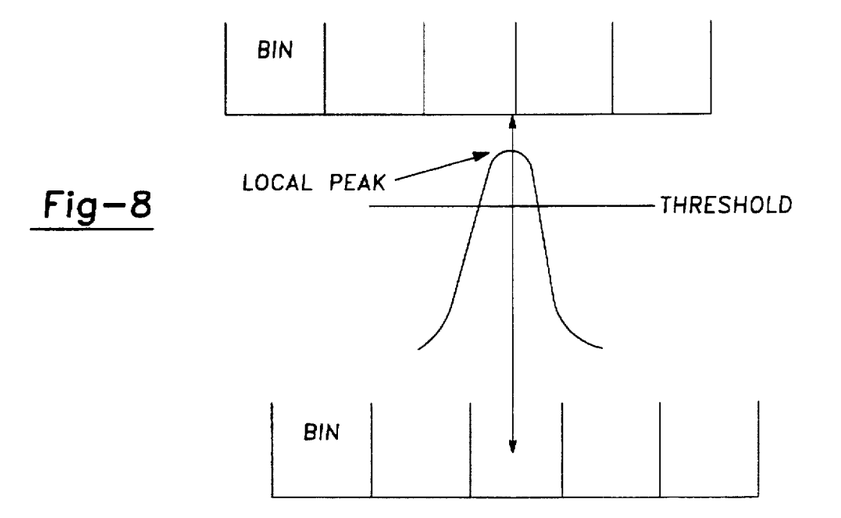
FIG. 8 is a "where is each local above-threshold peak of the signal" filter showing staggered bin tables for an alternate method of filtering in the laser rangefinder of the invention.

Other types of filters, such as "where is each local above-threshold peak of the signal" filters, which locate a point in time instead of a region, can have the problem of only flagging one or the other of the two bins. To avoid this problem for those types of filters susceptible to it, two count tables can be maintained, staggered from each other by one-half of a bin, as shown in FIG. 8. If the peak is near a bin boundary in one table, and will from shot to shot add counts to one bin or the other, it is as far as possible from a bin boundary in the other table, and will add counts to the same bin every time.

After a series of shots, both count tables are scanned to find the bin with the largest number of counts. If a target is near a bin boundary in one table, it will be near the middle of a bin of the other table, and that other table will have the larger number of counts. If the target is not near a bin boundary of either table, then the bins in both the tables will tie for counts and will disagree in range by one-half of a bin, and so is not in error and either answer may be chosen. If the system is to obtain the maximum range resolution, then it will follow this range bin determination step with the improved range accuracy step described above of going back to the accumulated analog signal and finding the location centroid of the nearest signal peak.

The modal range processing as discussed above is not limited in its application to laser rangefinders, but may also be applied to other rangefinders, such as radar and sonar rangefinders. Also, although the method has been described in terms of transmitted "pulses" it is applicable to other types of rangefinder systems that transmit other waveforms, such as coherent FM chirps.

The laser rangefinding technique of the invention was demonstrated by both simulation and experimentation. For the simulation, a computer model of a target-space scene was combined with an LRF performance computer model. The location, size and reflectance of a number of targets were specified. The LRF was aired at a target of interest with a specified boresight jitter. Then, a known simulation was performed where many LRF shots were taken. For each shot, a random boresight error, with the statistics of the specified jitter, is applied. With the misaimed laser beam shot, the energy-on-target calculation is applied to each target, and the LRF return signal collected in each range bin is determined. This signal, along with a calculation of the noise in the system, gives the probability of the signal crossing the detection threshold of the signal processor, i.e., the probability of detection. Another random number for each range bin, with the correct statistics, determines whether the threshold is crossed for that range bin on the particular LRF shot.

Figure 9A:
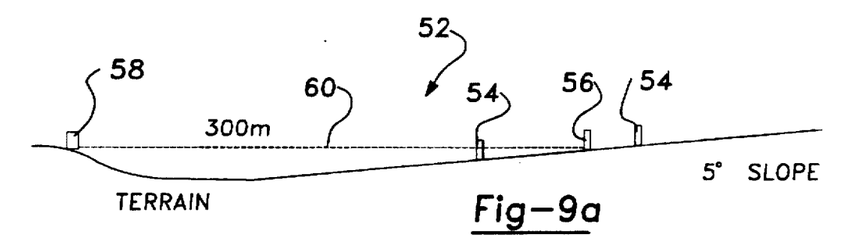
FIG. 9(a) shows a side view of a simulated scene to describe the laser rangefinder of the invention.
Figure 9B:
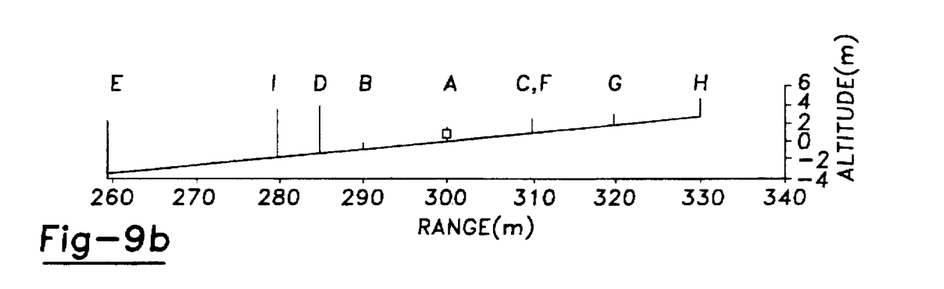
FIG. 9(b) shows an expanded side view of the simulated scene of FIG. 8(a)

FIG. 9(a) shows a side view depiction of a simulated scene 52 that includes a series of objects 54, a few of which are shown, and a target 56 of interest, positioned on a five degree incline so that the ground fills the scene behind the objects. An LRF 58 is shown directing a laser beam 60 towards the target 56 that is 300 meters away. FIG. 9(b) shows an expanded depiction of the area around the objects 54 such that all the objects 54 are shown and are labeled by a letter, where the target 56 is labelled A. The depiction in FIG. 9(b) gives the altitude and range of each of the objects 54 relative to the LRF 58.

Figure 10:
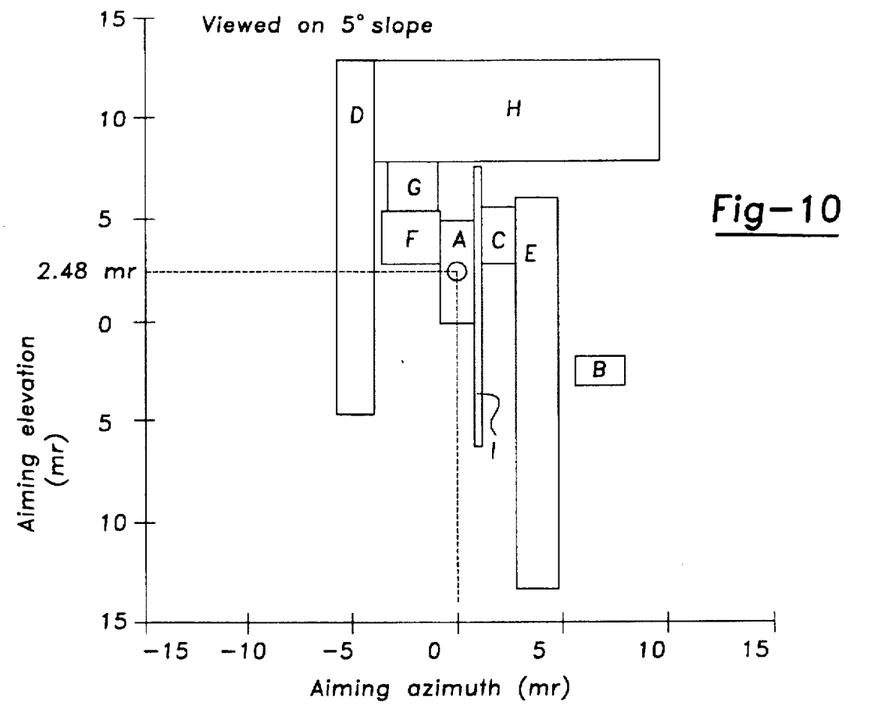
FIGS. 10(a) and 10(b) show front views of the simulated scene of FIG. 9.

FIG. 10(a) shows a front view of the simulated scene 52 in which the shape of each of the nine objects 54 is shown. This Figure also gives elevation and azimuth angular scales of the scene as seen from the position of the LRF 58. The target 56 subtends 4.8 mr vertically and 1.5 mr are horizontally. FIG. 10(b) gives a depiction of the front view of the objects 54 as if they were on level ground. The jitter used in the simulation was gaussian distributed with 0.75 mr radius per axis standard deviation. A series of beamwidths (gaussian profile $1/e^2$ intensity diameter) from 0.02 mr to 2.5 mr were used.

Figure 11:
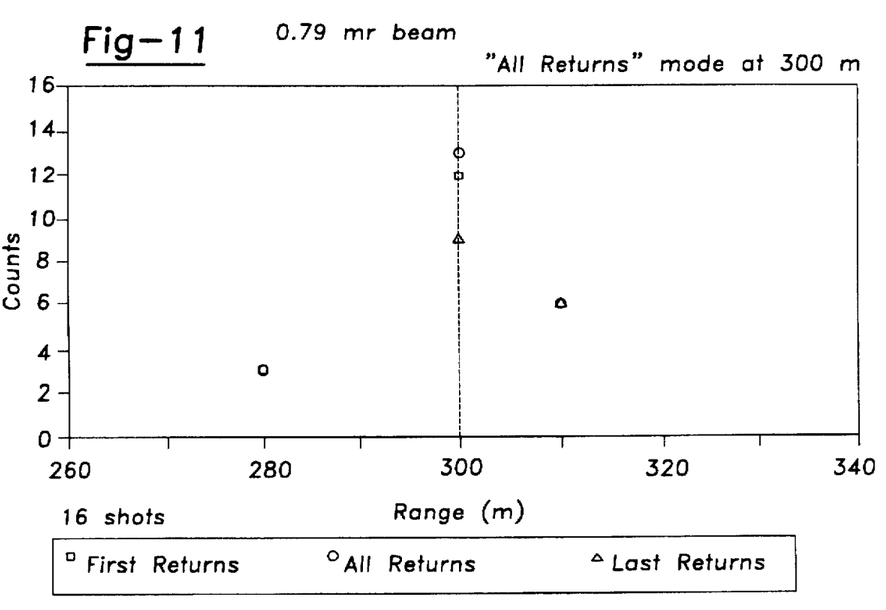
FIG. 11 shows a histogram of return signals for a sixteen-shot simulation of the laser rangefinder of the invention.

Data from the simulation can be presented in a histogram of return signals versus range, as shown in FIG. 11, for a beamwidth of 0.79 mr. The graph of FIG. 11 gives range on the horizontal axis and number of counts on the vertical axis. In this particular set of sixteen LRF shots, the A object gave a return on thirteen of the shots, the I object gave a return on three of the shots, the C object gave a return on six of the shots, and one shot had no return. Since the A object had the most returns, the method according to the invention chooses this object 54 as the target 56, which is the correct answer. This histogram also shows that on three of the sixteen LRF shots, the I object was the first return, on twelve of the shots, the A object was the first return, and on one of the shots, no return was received. Therefore, as is apparent, if first return logic was used on individual shots, as used in the prior art, the answer would have been wrong four out of sixteen times. Similarly, if last-return logic had been used, the A object would have been chosen nine times, the C object would have been chosen six times, and no target would have been chosen one time, giving wrong answers seven out of sixteen times.

Figure 12:
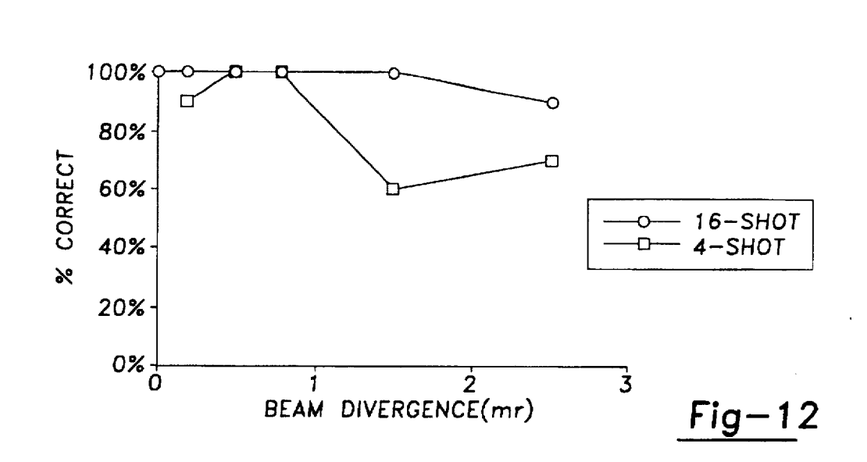
FIG. 12 is a graph that depicts percentage of cases giving correct range according to the laser rangefinding technique of the invention.
Figure 13:
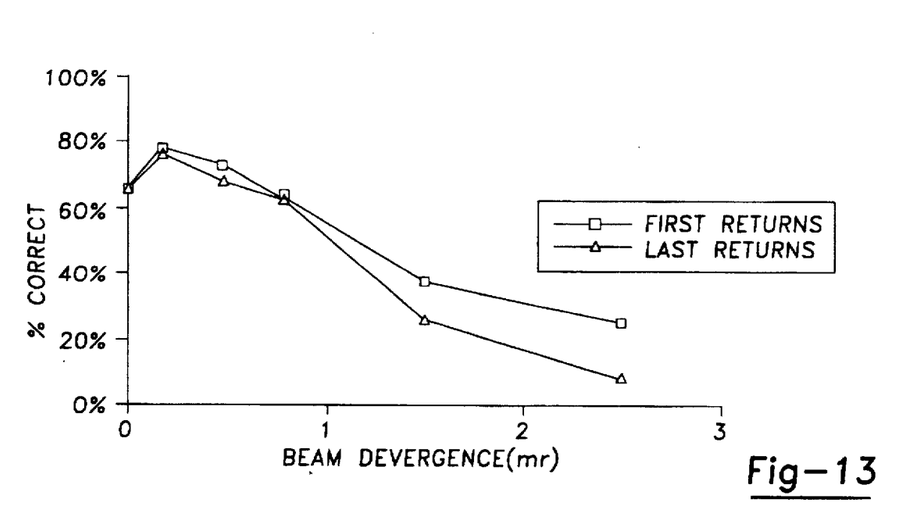
FIG. 13 is a graph depicting the percentage of cases giving correct range in a prior art laser rangefinding technique.

Several simulations, of the type summarized above were run for beamwidths from 0.02 mr to 2.5 mr for both sixteen-shot and four-shot bursts. FIG. 12 shows a graph of beam diversion (mr) on the horizontal axis and percent correct on the vertical axis to show the fraction of runs yielding the correct range to target using the modular range processing logic of the invention. FIG. 13 shows a graph showing beam divergence on the horizontal axis and percent correct on the vertical axis using the prior art logic of first return or last return for single shots. As is apparent, FIG. 13 shows much poorer results. At a beam divergence of 0.79 mr the modal processing of the invention gave the correct target range 100% of the time for both the sixteen-shot and the four-shot bursts, while the prior art first return logic gave the correct target range only 63% of the time, and the prior art last return logic gave the correct target range only 61% of the time. At a larger beamwidth of 1.5 mr, the sixteen-shot burst remained at the 100% correct target range and the four-shot burst dropped to 60% correct target range. However, the first return logic fell to 36% correct target range and the last return logic fell to 24% correct target range.

The multi-return, multi-pulse, modal processing for laser range finding of the invention was also experimentally tested. To perform the experiment, an electro-optical tracking system (EOTS) known to those skilled in the art, was used as the laser rangefinder. Detector data collected during the demonstration was digitized by an external PC-based data acquisition system and written into PC-compatible data files. The interface software required to fire the laser, acquire and process data, and provide the user interface was completed and integrated with the laser rangefinder.

The targets used for the tests included two sizes of whiteboards. The ranges utilized were 74 m, 184 m, 365 m, 370 m, 450 m, 606 m, and 627 m. Target exposures varied from about 20% to 100% exposed. Simulated gunner jitter was inserted into the LRF aiming, and then data was collected on identical targets for both single pulse and multiple pulse lasing.

As indicated in Table 1 below, a dramatic improvement for the modal return processing mode over the single pulse was shown, depending on the test conditions.

TABLE 1

| True Range | 74 m | 184 m | 365 m | 627 m | Total |
| --- | --- | --- | --- | --- | --- |
| Single Pulse | 10% | 0% | 60% | 30% | 25% |
| 4 Pulse MR, MP, Modal | 50% | 50% | 80% | 30% | 53% |
| 8 Pulse MR, MP, Modal | 80% | 70% | 100% | 60% | 78% |
| 12 Pulse MR, MP, Modal | 100% | 90% | 100% | 80% | 93% |

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A system for determining the range of an object of interest, said system comprising:

beam generating means for generating a plurality of successive beam pulses and for directing the beam pulses toward the object of interest;

beam detecting means for detecting a plurality of return beams reflected from objects illuminated by the beam pulses including the object of interest, said beam detecting means generating analog return signals indicative of the return beams; and processing means for processing the analog return signals, said processing means including a count table defining a first series of range bins in which each range bin represents a range of distances from the system, wherein for each of the beam pulses the processing means adds a count to each range bin for which the analog return signal satisfies particular conditions within that bin and wherein the processing means selects a range bin with the most counts to be the range of the object of interest.

2. The system according to claim 1 wherein the processing means accumulates the analog return signals over the pulses and determines a centroid of an analog return signal within the selected range bin to be the range of the object of interest.

3. The system according to claim 1 wherein the system is a laser rangefinder, the beam generating means is a laser beam generating device that generates laser beam pulses and the beam detecting means is an optical detector for detecting the return beams.

4. The system according to claim 1 wherein the system is included as part of a hand-held rifle to determine the range of potential targets.

5. The system according to claim 1 wherein a count is added to the range bins if the return signal is above a predetermined threshold level.

6. The system according to claim 1 wherein the processing means includes a second series of range bins, said second series of range bins being staggered from the first series of range bins by approximately one-half of a width of a bin, said processing means adding a count to each range bin in both the first and second series of range bins for each analog signal representing a range within those bins, said processing means selecting the range bins with the most counts to be the range of the object of interest.

7. The system according to claim 1 wherein the processing means selects a bin as the range of the object where the selected bin is selected from the group consisting of the bin having the most common first return signal, the most common last return signal, the most often the first return signal, and the most often the last return signal.

8. A laser rangefinder for determining the range of a target of interest, said rangefinder comprising:

a laser beam source, said laser beam source operable to generate a plurality of successive laser beam pulses and to direct the laser beam pulses toward the object of interest;

a photodetector, said photodetector responsive to return signals reflected from objects illuminated by the laser beam pulses including the object of interest, said photodetector operable to generate analog return signals indicative of the intensity of the return signals; and a processor, said processor being responsive to the analog return signals, said processor including a count table defining a first series of range bins in which each range bin represents a range of distances from the rangefinder, said processor accumulating counts over all of the laser beam pulses in each range bin in response to each analog return signal that represents a range defined by that bin that also satisfies particular conditions, wherein after the plurality of successive laser pulses, the processor selects the range of the range bin with the most counts to be the range of the target of interest.

9. The laser rangefinder according to claim 8 wherein the processor accumulates the analog return signals over the pulses and determines a centroid of the analog return signal within a particular selected range bin to be the range of the target of interest.

10. The rangefinder according to claim 8 wherein the rangefinder is included as part of a hand-held rifle to determine the range of potential targets.

11. The rangefinder according to claim 8 wherein a count is added to the range bins if the return signal is above a predetermined threshold level.

12. The rangefinder according to claim 8 wherein the processor includes a second series of range bins, said second series of range bins being staggered from the first series of range bins by approximately one-half of a width of a bin, said processor adding a count to each range bin in both the first and second series of range bins for each analog signal representing a range within those bins, said processor selecting the range bins with the most counts to be the range of the target of interest.

13. The rangefinder according to claim 8 wherein the processor selects a bin as the range of the target where the selected bin is selected from the group consisting of the bin having the most common first return signal, the most common last return signal, the most often first return signal, and the most often the last return signal.

14. A method of determining the range of an object of interest, said method comprising the steps of:

transmitting a plurality of successive beam pulses toward the object of interest;

detecting a plurality of return signals reflected from objects illuminated by the beam pulses including the object of interest;

generating analog return signals indicative of the return beams;

providing a count table defining a first series of range bins in which each range bin represents a range of distances from the system;

for all of the beam pulses, adding a count to each range bin for each analog return signal representing a range within that bin that satisfies particular conditions; and selecting the range bin with the most counts to be the range of the object of interest.

15. The method according to claim 14 further comprising the step of accumulating the analog return signals over the pulses and determining a centroid of an analog return signal within a particular selected range bin to be the range of the object of interest.

16. The method according to claim 14 wherein the step of generating a plurality of beam pulses includes generating a plurality of laser beam pulses, and the step of detecting the beam pulses includes detecting reflected laser beam pulses.

* * * * *

UNITED STATES PATENT AND TRADEMARK OFFICE
CERTIFICATE OF CORRECTION

PATENT NO : 5,760,887
DATED : June 2, 1998
INVENTOR(S) : DAVID FINK

It is certified that error appears in the above-identified patent and that said Letters Patent is hereby corrected as shown below:

In column 1, below the title, please insert the following paragraph:

--This invention was made with Government support under Contract No. DAAA21-91-C-0061 awarded by the Department of the Army. The Government has certain rights in this invention.--

Signed and Sealed this

Eighth Day of February, 2000

*Attest:*

Q. TODD DICKINSON

*Attesting Officer*    Commissioner of Patents and Trademarks